UNITED STATES PATENT OFFICE 2,465,974

PROCESS FOR THE PREPARATION OF AN ORGANIC DINITROHYDROCARBON

Clarence S. Coe, Long Beach, Edward C. Attané, Inglewood, and Thomas F. Doumani, Los Angeles, Calif., assignors to Union Oil Company of California, Los Angeles, Calif., a corporation of California No Drawing. Application January 12, 1946, Serial No. 641,002

11 Claims. (Cl. 260—644)

This invention relates to the production of nitrocompounds of unique chemical structure, and more specifically to the formation of dinitrocompounds and other polynitrocompounds from mononitrocompounds.

The invention contemplates as one of its objects the formation of dinitrocompounds by the controlled oxidation of primary or secondary mononitrocompounds in the presence of suitable catalysts as hereinafter disclosed. For primary nitrocompounds, (which have two replaceable protons on the carbon atom to which the nitro group is attached) the contemplated reaction may be represented as:

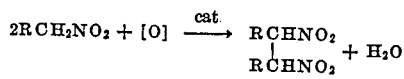

and for secondary nitrocompounds (which have only one replaceable proton on the carbon atom to which the nitro group is attached)

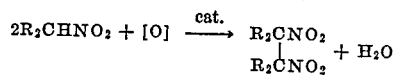

It is a further object of our invention to prepare polynitrocompounds from primary nitrocompounds by controlled catalytic oxidation thereof, such preparation being represented empirically as follows:

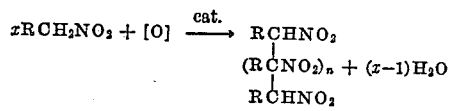

It is another object of our invention to prepare these dinitro and polynitrocompounds by a simple direct process which does not require the consumption of any chlorine. The above equations show that the replaceable protons of the nitrocompounds are removed with the formation of water, while the residues of the molecules condense to form the polynitrocompounds (including dinitrocompounds in the general term "polynitrocompounds").

Yet another object of the present invention is the preparation of useful nitrocompounds by the reaction of primary or secondary nitrocompounds with other organic compounds containing a replaceable proton (i. e. hydrogen atom) such as acids, aldehydes, amines and the like which reaction or condensation is accomplished by the controlled oxidation of a mixture of these compounds in the presence of one of the hereinafter described catalysts.

Other objects and advantages of our invention will become apparent to those skilled in the art as the description thereof proceeds.

The most general formula for the dinitrocompounds (i. e. dinitrohydrocarbons) prepared according to the present invention is as follows:

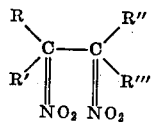

wherein R, R', R'', R''' are alkyl, cycloalkyl or aryl groups or hydrogen atoms. These dinitrocompounds can be referred to as "bis" nitrocompounds wherein the bond connecting the two hydrocarbon molecules is attached to carbon atoms each of which has a nitro group attached thereto, i. e., the nitro grups are on adjacent carbon atoms.

Heretofore dinitro- or polynitrocompounds have been prepared by the action of a halogen and an alkali on a primary or secondary nitroparaffin through the mechanism of salt formation and splitting out of an alkali halide. Thus, for example secondary nitroparaffins may be treated with one mole of sodium hydroxide and one mole of chlorine to yield a dinitroparaffin by the following reactions:

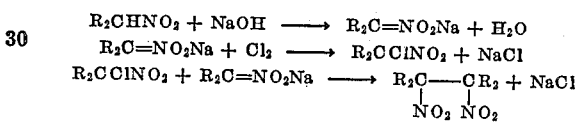

wherein R is an alkyl, aryl, or cycloalkyl group from the corresponding mononitrocompounds. Similar reactions have been reported for aliphatic compounds having aromatic substituents. Thus, Nenitzescu and Isacescu: Ber. 63, 2491 (1930) treated the sodium derivative of penylnitromethane with iodine and obtain 1,2-dinitro-1,2-diphenylethane.

It has been reported that the silver salt of nitroethane decomposes spontaneously, yielding 2,3-dinitrobutane. The reaction seems to be general, since the silver salt of nitropentane reacts similarly to give a dinitrodecane and the silver salt of phenylnitromethane gave 1,2-dinitro-1,2-diphenylethane. The formation of dinitro and polynitrocompounds from mononitrocompounds by the above methods is summarized by H. B. Hass and Elizabeth F. Riley in a review on the nitroparaffins contained in Chemical Reviews, vol. 32, No. 3, June, 143.

It is apparent from the foregoing discussion and from reference to the review cited that all of these processes for the formation of the dinitro or polynitrocompounds possess the disadvantage of depending upon the formation of a halogen derivative of the nitrocompounds or the silver salts thereof. As previously set forth in the objects of the present invention we contemplate the formation of these unique nitrocompounds without the necessity of employing a halogen or a silver salt.

The aforementioned objects are accomplished according to our invention by a process which comprises reacting a primary or secondary nitrocompound with an oxidizing agent in the presence of an alkaline catalyst. Thus a nitrocompound such as nitrocyclohexane is subjected, in the presence of an alkaline catalyst as hereinafter set forth, to the action of a suitable oxidizing agent whereby dinitrodicyclohexyl is formed and is separated as a flaky, white solid from the reaction mixture. In the oxidation of a primary nitrocompound as herein described, it is possible to obtain either dinitro or polynitrocompounds. Which of these is produced is a function of various operational variables. Thus the use of an inorganic solvent as the reaction media will favor the formation of the dinitrocompounds for they will be removed from the reaction upon formation by precipitation. On the other hand the use of an organic solvent as the reaction medium will favor the formation of the polynitrocompounds other than the dinitrocompounds inasmuch as the intermediate dinitro- form will remain dissolved in the solvent medium and will be thus available for further condensation. Temperatures and pressures may also be utilized to control the course of the reaction. We have found in this regard that higher temperatures and pressures will favor the formation of the polynitrocompounds and conversely the lower temperatures and pressures will favor the formation of a dinitrocompound. However, the preferred method of controlling the oxidation of the primary nitrocompounds is by the selection of the proper solvent medium as above described.

Suitable oxidizing agents which may be employed in accordance with the process of our invention are air, oxygen, hydrogen peroxide, organic peroxides, ozone, inorganic persalts such as persulfates, perborates and the like, and inorganic metal salts capable of reduction such as those of iron, copper, titanium, and the like.

In order to catalyze or induce the desired reaction whether it be by strict catalytic action or by the mechanism of intermediate compound formation, we have found that it is necessary to employ alkaline catalysts in the reaction mixture. It is probable that these catalysts actually form intermediate compounds therein and are subsequently liberated in the original form upon completion of the reaction. The compounds which we have found to be suitable as catalysts for the reaction may be inorganic such as the alkali metal hydroxides including sodium hydroxide, potassium hydroxide, magnesium hydroxide, the alkali carbonates, the alkaline earth hydroxides, including barium hydroxide, strontium hydroxide and calcium hydroxide, the alkaline earth oxides, and organic compounds such as the nitrogen bases, as for example, pyridine, quinoline, morpholine, and the like, and alkylamines such as propylamine, butylamine, amylamine, tripropylamine, diethylamine, and the like and the alkanolamines such as ethanolamine, diethanolamine, propanolamine, and the like.

In certain instances it is necessary to perform the reaction in a solvent medium in order to maintain the reactants, intermediate products, and catalyst in solution. This is particularly true in those instances in which an inorganic alkaline catalyst is employed. One advantage of the process resides in the fact that substantially any solvent or mixture of solvents may be employed which performs the above function for it appears that the desired reaction is in no way adversely affected by the presence of the solvent. Thus we have found that the polar solvents such as water, alcohols, ketones, other oxygenated organic solvents and the like may be employed, as well as non-polar solvents such as the hydrocarbons, halogenated hydrocarbons, and the like, which in many instances will perform the desired function. It is not intended that our invention be limited by the usage of any particular solvent for in many cases an extraneous solvent is not required and in those cases in which a solvent is necessary, the selection thereof may be made from a large group of compounds, providing only that the solvent selected will function to keep the reactants and catalyst in solution in one of the liquid phases present in the reaction.

The process of our invention may be carried out at temperatures from below room temperature to above 200° C. and at pressures from atmospheric to as high as 10 atmospheres and higher. The higher temperatures increase the rate of reaction but must be limited in the upper ranges to prevent side reactions; the upper limit in such cases is governed by the reactants employed and the products formed, but it has been generally established to be in the neighborhood of 200° C. At lower temperatures such as room temperature or the like, the reaction rate appears to be relatively slow but may be increased to a certain extent by the application of higher pressures. The reaction may be carried out intermittently or continuously. In regard to continuous operation the majority of the dinitro- and polynitrocompounds which are formed are solids at the temperatures and pressures of operation, and an apparatus for continuous processing may be employed in which a portion of the reaction mixture is continuously withdrawn from the reaction chamber and passed through a filter to recover the solid reaction product from the mother liquor which is thereupon recycled to the reaction chamber. Fresh feed is also introduced thereto in proportion to the amount of reaction product recovered in the filtering operation. The initial catalyst charged to the reaction chamber is maintained therein and there is no need to add fresh catalyst.

In order to accomplish the reaction, it is necessary that the reaction chamber be provided with means for introducing the oxidizing agent to be employed. Preferably, the oxidizing agent is introduced or commingled with the feed in a finely dispersed form in order to insure more complete reaction. In those instances where the oxidizing agent employed is of gaseous nature such as air, oxygen or the like, it may be continuously bubbled through the mixture by means of a dispersion screen or sintered glass filter located at the point of entry of oxidizing agent. In the event that the oxidizing agent is a solid or a liquid, it may be dissolved or dispersed in the feed stream to the reaction chamber.

Many modifications in the above described apparatus, or in procedural methods will be apparent to those skilled in the art, but such modifications will not deviate from the principles of the present invention, which comprise essentially the catalytic oxidation of organic nitrocompounds to form dinitro- or polynitro-compounds or the catalytic oxidation of nitrocompounds in conjunction with other organic compounds to form unique condensation products as hereafter described.

Although we prefer to employ the nitrocompounds (i. e. mononitrohydrocarbons) of general formula

wherein R and R' may be alkyl, cycloalkyl, or aryl groups or hydrogen atoms, as starting materials for the contemplated reaction, we may also employ the organic nitrites of general formula

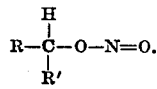

It is known that the nitrites are transformed at elevated temperatures to the corresponding nitrocompounds and thus by oxidizing at temperatures of 100° C. or higher we may employ the nitrites, simultaneously accomplishing the transformation to the nitrocompound and the oxidation of the thus formed nitrocompound to dinitro- or other polynitrocompounds. In this manner the transformation of the nitrites to the corresponding nitrocompounds is favored inasmuch as the quilibrium is continuously being shifted toward the side of the nitrocompounds by oxidizing those that are formed.

Although the preferred embodiment of our invention resides in the condensation of mononitrocompounds to form dinitro- or polynitrocompounds by the catalytic oxidation of mononitrocompounds, the invention is also useful for the oxidation of compounds containing more than one primary or secondary nitro groups, where the primary group is

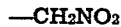

and the secondary group is

Thus, if two or more nitro groups are contained in one compound, polymers thereof may be formed by oxidation.

The advantages and utility of our invention may be more readily appreciated by reference to the following examples:

*Example I*

A mixture of two parts of nitrocyclohexane, one part of sodium hydroxide and one part of water (proportions on a molecular basis) was introduced into a reaction vessel provided with means for introducing air into the mixture at atmospheric pressure and at room temperature. Air was passed into the reaction mixture for a period of approximately 48 hours at which time the liquid nitrocyclohexane had completely disappeared and was replaced by a flaky, white solid with a melting point of 209° C. to 210° C. (decomposition). This compound was found to be pure 1,1'-dinitrodicyclohexyl having the following structure:

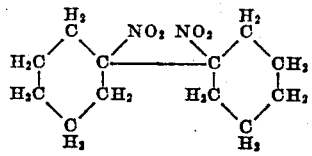

At superatmospheric pressures of from about 50 to 100 pounds per square inch and at elevated temperatures of from about 75° C. to 150° C. the above reaction proceeds much more rapidly.

*Example II*

A mixture of one part of 2-nitropropane and one-half part of sodium hydroxide dissolved in one-half part of water (proportions on a molecular basis) was treated with a slow stream of air for about four days at atmospheric pressure and at room temperature (about 30° C.). In this particular operation a large proportion of the 2-nitropropane was lost by entrainment through the condenser, but that part which remained was converted into a white solid having a melting point of 208° C. The melting point of 2,3-dimethyl-2,3-dinitrobutane is reported by Konovalov, J. Russ. Phys. Chem. Soc. 37, 1119 (1905) to be 208° C. Here again higher temperatures and pressures increase the rapidity of the reaction appreciably. Further, if organic solvents such as ethanol or heterocyclic oxygen-containing compounds are employed as the reaction medium, the rate of reaction is more rapid than when water is so used.

*Example III*

Two parts of nitrocyclohexane and one part of sodium hydroxide in aqueous solution was treated by the continuous addition of 30% hydrogen peroxide. The reaction mixture became cloudy and a white solid separated which was proved to be 1,1'-dinitrodicyclohexyl. It was found that the addition of a small amount of sulfuric acid to the hydrogen peroxide aided the reaction.

The simplicity and efficiency with which dinitro and polynitrocompounds may be formed by the process of our invention should be readily appreciated by those skilled in the art from the foregoing description and examples. The reaction is simple and straight-forward, since side reactions can be made negligible and the unreacted constituents are readily recoverable. Compounds of the types hereinbefore disclosed find wide application as chemical intermediates, as, for example, 1,1'-dinitrodicyclohexyl can be readily hydrogenated to form cyclohexylamine. These compounds are also widely used as insecticides, disinfectants, fungicides, bactericides, and the like.

Whereas, the foregoing description and examples have been concerned with the catalytic oxidation of unsubstituted nitrocompounds, it should be emphasized that our invention is not limited to the usage of such compounds. We have found that we can oxidize, in the manner set forth, any organic compound having the nitro- or nitrite linkage as hereinbefore illustrated and thus substitution products of the various nitrocompounds or nitrites may be employed such as for example halogenated or hydroxy compounds or the like. Thus, in the various empirical equations employed to illustrate our invention, the representation of an alkyl, aryl or cycloalkyl group by the letter R is intended to include such substitution products.

Many other reactions may be postulated in which catalytic oxidation of organic nitrocompounds according to the present invention may be utilized, and realizing that many modifications will occur to those skilled in the art, we claim:

1. A process for the preparation of an organic dinitrohydrocarbon in which the nitro groups are on adjacent carbon atoms, which comprises contacting a lower molecular weight mononitrohydrocarbon having a replaceable hydrogen atom on the carbon atom to which the nitro group is attached, with an oxidizing agent selected from the class consisting of air, oxygen, hydrogen peroxide, organic peroxides and ozone, in the presence of an alkaline catalyst at a temperature not greater than about 200° C. for a time sufficient to remove a hydrogen atom from two of said mononitrohydrocarbons to form water, while simultaneously condensing the residues of said nitrocompounds to form said dinitrohydrocarbon.

2. A process for the preparation of a dinitrohydrocarbon in which the nitro groups are on adjacent carbon atoms, which comprises contacting a mononitrohydrocarbon having a replaceable hydrogen atom on the carbon atom to which the nitro group is attached, with an oxidizing agent selected from the class consisting of air, oxygen, hydrogen peroxide, organic peroxides and ozone, in the presence of an alkaline catalyst, at a temperature not greater than about 200° C. for a time sufficient to remove one of said replaceable hydrogen atoms from each of two molecules of said mononitrohydrocarbon to form water and said dinitrohydrocarbon.

3. A process according to claim 2 in which the reaction is carried out while the reactants and the catalyst are dissolved in a solvent.

4. A process according to claim 2 in which the reactants and the catalyst are dissolved in water.

5. A process according to claim 2 in which the alkaline catalyst is an inorganic alkaline catalyst.

6. A process according to claim 2 in which the alkaline catalyst is an amine.

7. A process according to claim 2 in which the alkaline catalyst is an alkali metal hydroxide, and the catalyst and the mononitrohydrocarbon are dissolved in water.

8. A process for the preparation of a dinitrohydrocarbon in which the nitro groups are on adjacent carbon atoms, which comprises dissolving a mononitrohydrocarbon in an aqueous solution of sodium hydroxide, and contacting the resulting solution with air at a temperature not greater than 200° C. for a sufficient time to condense two molecules of said mononitrohydrocarbon with the formation of water and said dinitrohydrocarbon.

9. A process for the preparation of a dinitrohydrocarbon in which the nitro groups are on adjacent carbon atoms, which comprises dissolving a mononitrohydrocarbon in an aqueous solution of sodium hydroxide, and contacting the resulting solution with hydrogen peroxide at a temperature not greater than 200° C. for a sufficient time to condense two molecules of said mononitrohydrocarbon with the formation of water and said dinitrohydrocarbon.

10. A process according to claim 9 in which a small amount of sulfuric acid is present in the hydrogen peroxide.

11. A process according to claim 9 in which the nitrohydrocarbon is nitrocyclohexane and a small amount of sulfuric acid is present with the hydrogen peroxide.

CLARENCE S. COE.
EDWARD C. ATTANÉ.
THOMAS F. DOUMANI.

REFERENCES CITED

The following references are of record in the file of this patent:

UNITED STATES PATENTS

| Number | Name | Date |
| --- | --- | --- |
| 702,171 | Bischler | June 10, 1902 |
| 1,956,030 | Hopff et al. | Apr. 24, 1934 |
| 2,001,701 | Beard | May 21, 1935 |
| 2,168,305 | Lippincott | Aug. 1, 1939 |
| 2,181,411 | Vanderbilt | Nov. 28, 1939 |
| 2,181,531 | Hass et al. | Nov. 28, 1939 |
| 2,256,839 | Hass et al. | Sept. 23, 1941 |
| 2,337,912 | McBee et al. | Dec. 28, 1943 |
| 2,343,256 | Hass et al. | Mar. 7, 1944 |
| 2,365,981 | Tindall | Dec. 26, 1944 |
| 2,378,169 | Agre et al. | June 12, 1945 |
| 2,383,603 | Larrison et al. | Aug. 28, 1945 |
| 2,385,037 | Smith | Sept. 18, 1945 |
| 2,394,230 | Billman | Feb. 5, 1946 |
| 2,396,282 | Nygaard et al. | Mar. 12, 1946 |
| 2,401,268 | Nygaard et al. | May 28, 1946 |

FOREIGN PATENTS

| Number | Country | Date |
| --- | --- | --- |
| 142,878 | Great Britain | June 10, 1920 |
| 544,158 | Great Britain | Mar. 31, 1942 |

OTHER REFERENCES

Hass et al., "Chemical Reviews," vol. 32, pages 384–385.

Seigle et al., "J. Org. Chem.," vol. 5 (1940), pages 100 to 104.

Certificate of Correction

Patent No. 2,465,974.                                                                March 29, 1949.

CLARENCE S. COE ET AL.

It is hereby certified that error appears in the printed specification of the above numbered patent requiring correction as follows:

Column 2, lines 6 to 10, for the formula reading

and that the said Letters Patent should be read with this correction therein that the same may conform to the record of the case in the Patent Office.

Signed and sealed this 4th day of October, A. D. 1949.

[SEAL]

THOMAS F. MURPHY,
*Assistant Commissioner of Patents.*